(12) United States Patent
Choi et al.

(10) Patent No.: US 10,938,076 B2
(45) Date of Patent: Mar. 2, 2021

(54) COOLANT COOLING TYPE BATTERY

(71) Applicants: Hyundai Motor Company, Seoul (KR); Kia Motors Corporation, Seoul (KR)

(72) Inventors: Jun Seok Choi, Gyeonggi-do (KR); Yong Jae Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 228 days.

(21) Appl. No.: 16/172,806

(22) Filed: Oct. 28, 2018

(65) Prior Publication Data
US 2019/0379093 A1 Dec. 12, 2019

(30) Foreign Application Priority Data
Jun. 12, 2018 (KR) .................. 10-2018-0067453

(51) Int. Cl.
| | |
|---|---|
| *H01M 10/613* | (2014.01) |
| *H01M 10/6557* | (2014.01) |
| *H01M 10/625* | (2014.01) |
| *H01M 2/10* | (2006.01) |
| *H01M 2/20* | (2006.01) |
| *H01M 10/6554* | (2014.01) |
| *H01M 10/647* | (2014.01) |

(52) U.S. Cl.
CPC ....... *H01M 10/613* (2015.04); *H01M 2/1077* (2013.01); *H01M 2/206* (2013.01); *H01M 10/625* (2015.04); *H01M 10/647* (2015.04); *H01M 10/6554* (2015.04); *H01M 10/6557* (2015.04); *H01M 2220/20* (2013.01)

(58) Field of Classification Search
CPC ............. H01M 10/613; H01M 10/625; H01M 10/647; H01M 10/6554; H01M 10/6557
See application file for complete search history.

(56) References Cited

U.S. PATENT DOCUMENTS

| | | | |
|---|---|---|---|
| 9,017,588 B2* | 4/2015 | Ikeda ................ | G03G 15/0812 264/212 |
| 2014/0030560 A1* | 1/2014 | Lev ........................ | B60L 50/66 429/72 |
| 2015/0009607 A1* | 1/2015 | Daamen ............ | H01R 12/7088 361/640 |
| 2015/0214586 A1* | 7/2015 | Yeow ................ | H01M 10/625 429/120 |

(Continued)

FOREIGN PATENT DOCUMENTS

| | | |
|---|---|---|
| KR | 10-2015-0042076 A | 4/2015 |
| KR | 10-2016-0128019 A | 11/2016 |

*Primary Examiner* — Amanda C. Walke
(74) *Attorney, Agent, or Firm* — Mintz Levin Cohn Ferris Glovsky and Popeo, P.C.; Peter F. Corless

(57) ABSTRACT

A coolant cooling type battery is provided. The coolant cooling type battery includes battery cells each having tabs to electrically connect the battery cells to each other by respective tabs. The respective tabs of the battery cells are arranged in a unidirectional alignment. Additionally, the battery includes busbars each interconnecting the tabs of adjacent battery cells of the multiple battery cells with each other to form an electrical connection between the battery cells and a coolant channel that is connected to the multiple busbars and has coolant flowing therein.

8 Claims, 4 Drawing Sheets

(56) References Cited

U.S. PATENT DOCUMENTS

| | | | |
|---|---|---|---|
| 2016/0190663 A1* | 6/2016 | Bahrami | H01M 10/6553 |
| | | | 429/72 |
| 2016/0218401 A1* | 7/2016 | Hermann | H01M 2/305 |
| 2017/0229208 A1* | 8/2017 | Kovent | H01M 10/6561 |
| 2018/0261992 A1* | 9/2018 | Bower | H01M 2/202 |
| 2019/0103624 A1* | 4/2019 | Lim | H01M 10/6553 |

\* cited by examiner

COOLANT COOLING TYPE BATTERY

CROSS REFERENCE TO RELATED APPLICATION

The present application claims priority to Korean Patent Application No. 10-2018-0067453, filed Jun. 12, 2018, the entire contents of which is incorporated herein for all purposes by this reference.

BACKGROUND

Field of the Invention

The present invention relates generally to a coolant cooling type battery and, more particularly, to a coolant cooling type battery which eliminates a cooling channel and a cooling plate between battery cells of the battery, thereby increasing volume-energy density of the battery.

Description of the Related Art

Problems of global warming and environmental pollution caused by the use of fossil fuels have led to active research and development of environmentally friendly vehicles that reduce emissions of pollution in the automobile industry, and the market of such vehicles is gradually expanding. As such environmentally friendly vehicles, an electric vehicle, a hybrid vehicle, and a plug-in hybrid vehicle using electric motors that generate a driving force by using electric energy instead of internal combustion engines that generate a driving force by combusting fossil fuels have been developed. These environmentally friendly vehicles using electric energy, an electric vehicle and a plug-in hybrid vehicle are configured such that electricity is supplied from an external charging facility connected to the grid to charge a battery within a vehicle, and electricity charged and stored in the battery is used to produce kinetic energy for a moving vehicle.

The battery used in such environmentally friendly vehicles is required to have a high output and thus generates a substantial amount of heat. Thus, it is important to discharge the heat generated in the battery to improve performance and lifespan thereof. In the related art, a direct air cooling system has been provided as a cooling system for discharging heat of a battery in which cooling air is directly supplied between multiple cells of a battery. Additionally, an indirect liquid cooling system has been developed in which a channel having coolant flowing therein is provided at a side of a battery and a cooling plate being in contact with the cooling channel is positioned between multiple cells whereby heat of the battery cells is discharged to the cooling channel, etc.

The direct air cooling system in the related art requires a space, that is, an air gap to allow cooling air to flow between the multiple battery cells of a battery. Furthermore, the indirect liquid cooling system requires a cooling plate having a predetermined thickness between the battery cells. Thus, since such a cooling system for a battery in the related art must include the air gap or the cooling plate between the battery cells, the battery cells are arranged at a regular interval, leading to an increase in the volume of the battery. In other words, the cooling system for a battery in the related art is problematic in that volume-energy density representing output relative to volume of the battery is reduced.

The foregoing is intended merely to aid in the understanding of the background of the present invention, and is not intended to mean that the present invention falls within the purview of the related art that is already known to those skilled in the art.

SUMMARY

Accordingly, the present invention provides a coolant cooling type battery capable of increasing volume-energy density by realizing an excellent battery cooling performance without requiring a cooling channel or a cooling plate between battery cells constituting the battery.

According to one aspect of the present invention, a coolant cooling type battery may include: a plurality of battery cells each having tabs to electrically connect the battery cells to each other by respective tabs, the respective tabs of the multiple battery cells being arranged in a unidirectional alignment; a plurality of busbars each interconnecting the tabs of adjacent battery cells of the battery cells with each other to form an electrical connection between the battery cells; and a coolant channel connected to the busbars and having coolant flowing therein.

In the exemplary embodiment of the present invention, the battery may further include a planar-shaped busbar housing having the plurality of busbars attached to a lower surface thereof. The coolant channel may be attached to an upper surface of the busbar housing. In addition, the busbar housing may be made of a plastic material. The coolant channel may be made of the same material as the busbar housing. Further, the busbar housing may include an opening through which the busbar is exposed upward outside a top of the busbar housing. Welding energy may be emitted to a top of the busbar exposed through the opening to thus the busbar and the tabs positioned under the busbar together.

According to another aspect of the present invention, a coolant cooling type battery may include: a plurality of battery cells each having tabs to electrically connect the battery cells to each other by respective tabs, the respective tabs of the battery cells being arranged in a unidirectional alignment; and a plurality of busbar assemblies each having a plurality of busbars each interconnecting the tabs of a part of the battery cells with each other, the part of the battery cells being arranged adjacent to each other, to form an electrical connection between the part of the battery cells, and having a planar-shaped busbar housing having the plurality of busbars attached to a lower surface thereof. The busbar assembly may have a coolant channel attached to an upper surface of the busbar housing and the plurality of busbar assemblies may be configured such that respective coolant channels thereof are arranged in a direction in which the battery cells are aligned, and are joined together.

In the exemplary embodiment of the present invention, the busbar housing may be made of a plastic material and the coolant channel may be made of the same material as the busbar housing. In addition, the busbar housing may include an opening through which the busbar is exposed upward outside a top of the busbar housing. Welding energy may be emitted to a top of the busbar exposed through the opening to weld the busbar and the tabs positioned under the busbar together.

According to the coolant cooling type battery, heat generated in the tabs of the battery cells may be efficiently discharged through the busbars directly connected to the tabs of the battery cells of the battery and through the coolant channel connected to the busbars. In particular, according to the coolant cooling type battery, the tabs where a greatest amount of heat is generated in the battery cell may be cooled, and thus, effect of battery cooling may be maximized. In addition, even when the cooling plate is omitted between the multiple battery cells, the excellent cooling performance may be realized as compared with an indirect liquid cooling system having the cooling plate in the related art. Thus, according to the coolant cooling type battery of the present invention, the volume of the entire battery may be reduced by omitting provision of the cooling plate between the battery cells, thereby achieving an increase in the volume-energy density of the battery.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
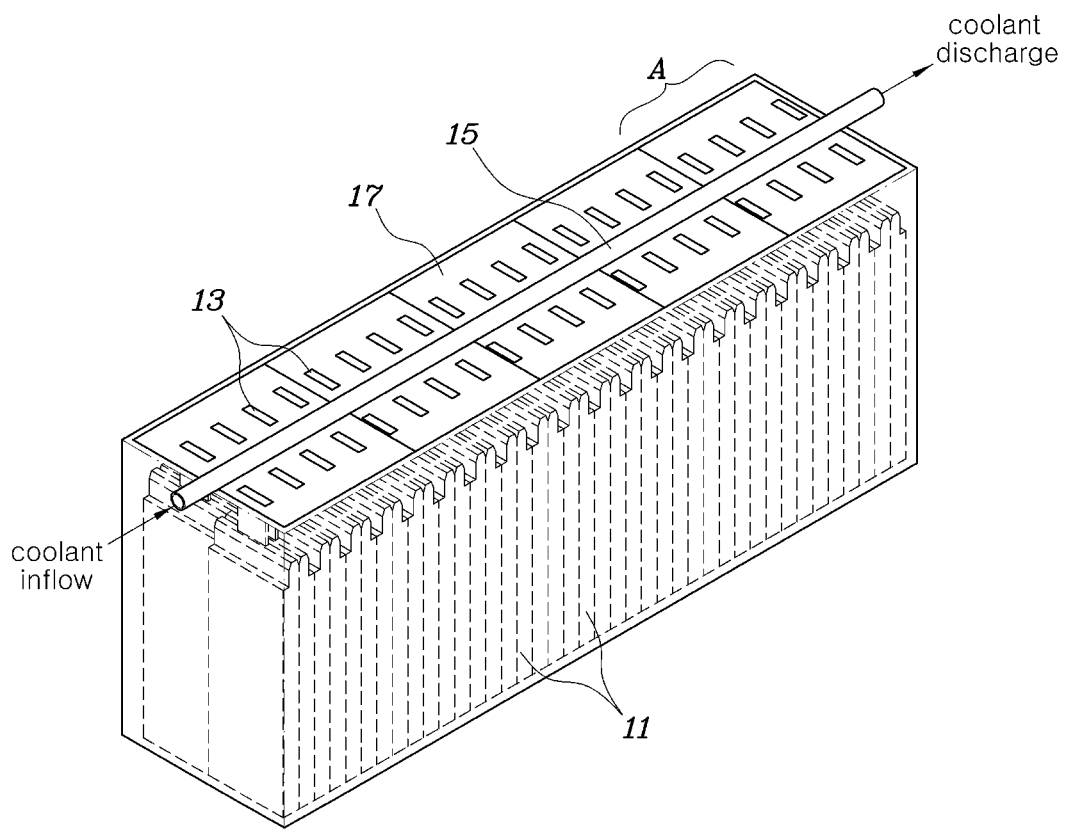
FIG. 1 is a perspective view showing a coolant cooling type battery according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinbelow, exemplary embodiments of the present invention will be described in detail with reference to the accompanying drawings. Throughout the drawings, the same reference numerals will refer to the same or like parts.

Figure 2:
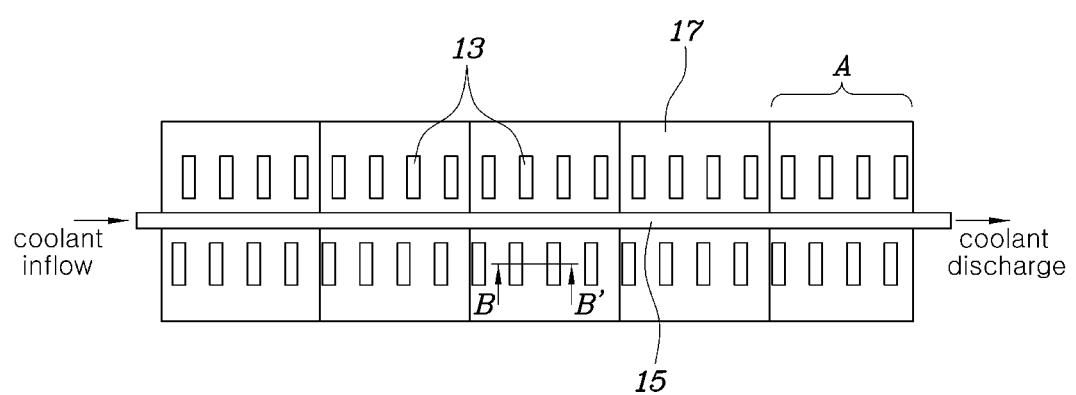
FIG. 2 is a plan view showing the coolant cooling type battery according to the exemplary embodiment of the present invention.
Figure 3:
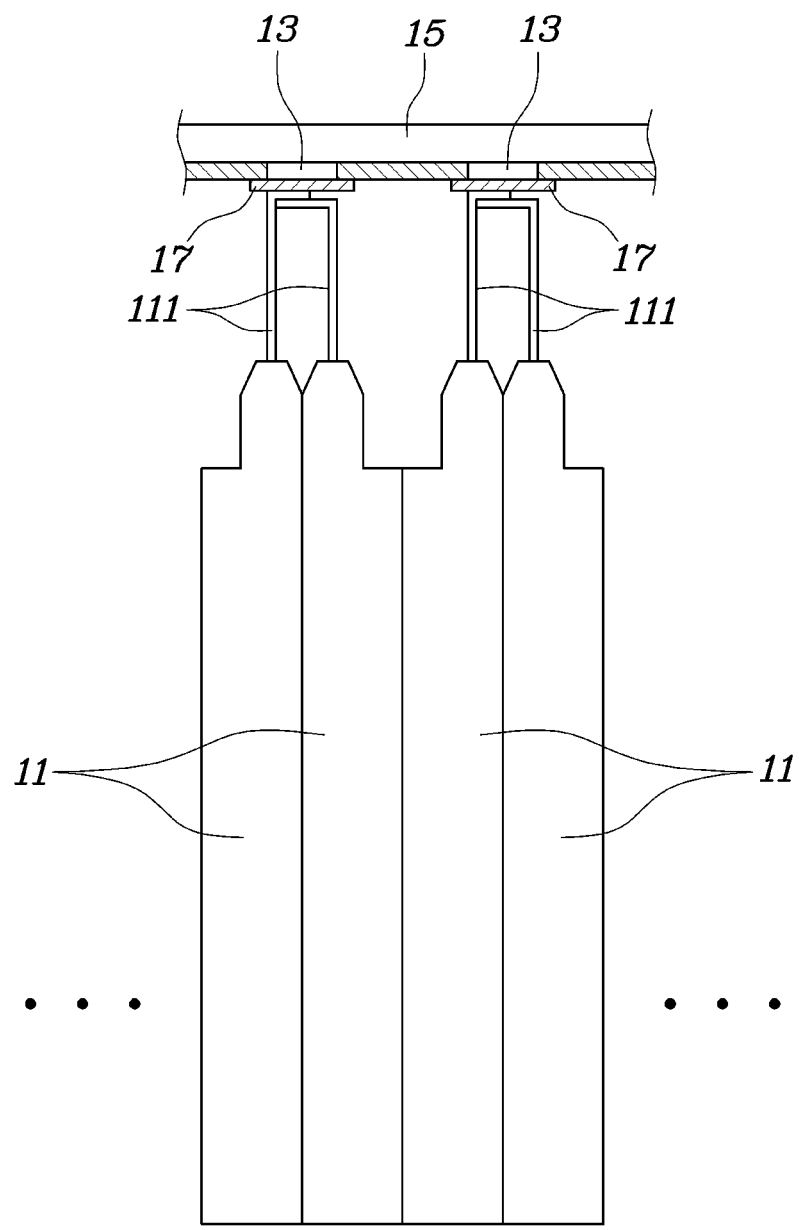
FIG. 3 is a partial sectional view showing the coolant cooling type battery according to the embodiment of the present invention showing a partially cut-away section taken along line B-B' in FIG. 2.
Figure 4:
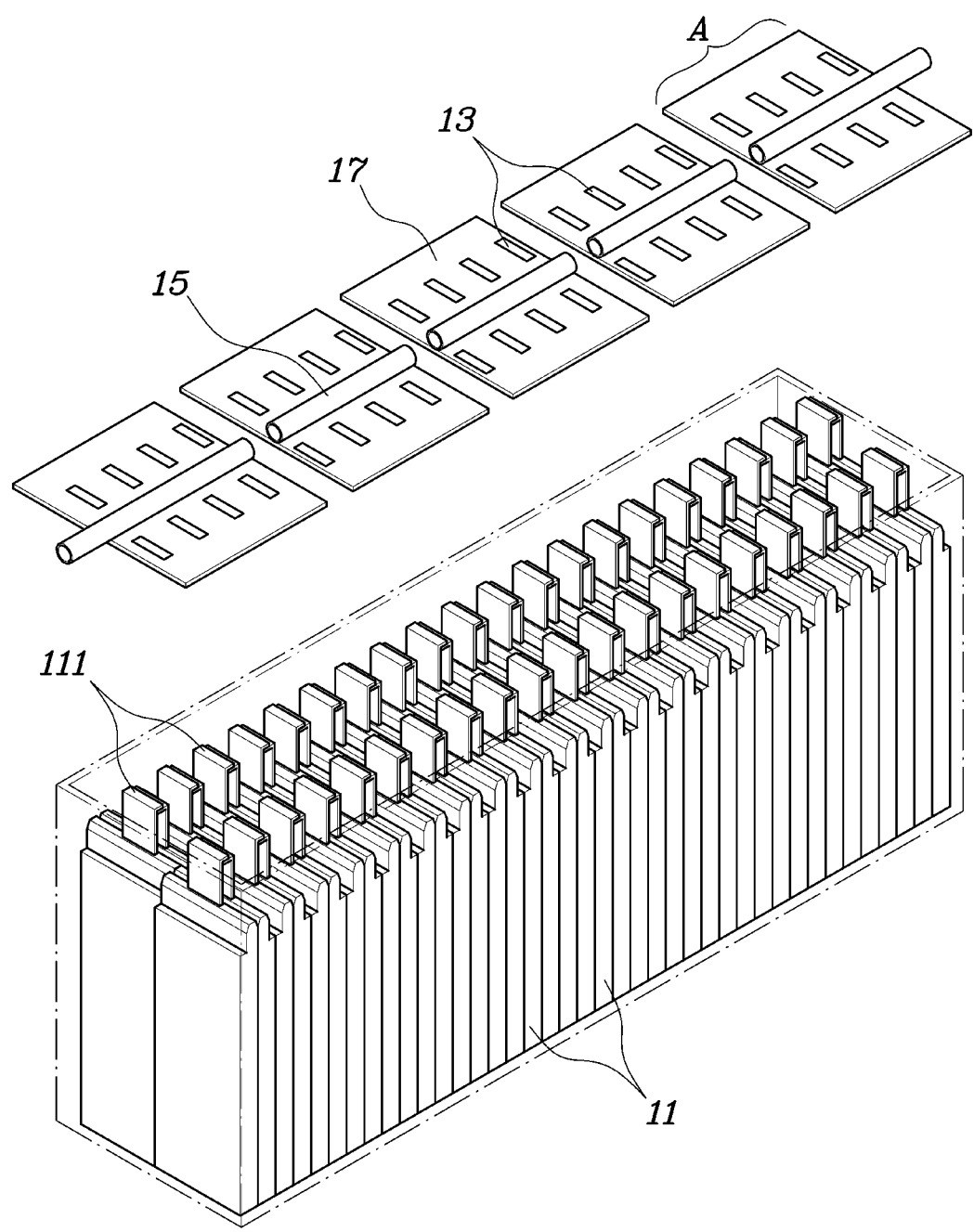
FIG. 4 is a detailed view showing a coolant cooling type battery according to an exemplary embodiment of the present invention.

FIG. 1 is a perspective view showing a coolant cooling type battery according to an exemplary embodiment of the present invention, FIG. 2 is a plan view showing the coolant cooling type battery according to the exemplary embodiment of the present invention, FIG. 3 is a partial sectional view showing the coolant cooling type battery according to the exemplary embodiment of the present invention showing a partially cut-away section taken along line B-B' in FIG. 2, and FIG. 4 is a detailed view showing a coolant cooling type battery according to an exemplary embodiment of the present invention.

Referring to FIGS. 1 to 3, a coolant cooling type battery according to an exemplary embodiment of the present invention may include a plurality of battery cells 11, a plurality of busbars 13, and a coolant channel 15. Each of the battery cells 11 is a unit for storing a predetermined amount of electric energy. The plurality of battery cells 11 may form an electrical connection relationship with each other, and this connection relationship may be formed by selectively employing a serial or parallel connection structure as required. The voltage and capacity of the entire battery may be determined by the number of the battery cells 11 and by the connection relationship therebetween.

The battery cell 11 may include tabs 111 operating as electrodes through which electric energy stored in the battery cell 11 may be output in the form of a current upon discharging whereas electric energy to be stored in the battery cell 11 may be input in the form of a current upon charging. The plurality of battery cells 11 may be electrically connected to each other by connection between respective tabs 111 thereof. The plurality of battery cells 11 may be arranged such that the respective tabs 111 thereof are arranged in a unidirectional alignment, and thus, an electrical connection between the tabs 111 of the battery cells 11 may be formed.

FIGS. 1 to 4 show an example in which both a tab 111 operating as a positive (+) electrode and a tab 111 operating as a negative (−) electrode are disposed at a side of a rectangular shaped battery cell 11, but the present invention is not limited to this structure. For example, for a rectangular shaped battery cell having a structure in which tabs 111 having polarities different from each other are disposed at opposite sides of the battery cell, respectively, the busbars and the coolant channel that will be described later may be respectively installed at the opposite sides of the battery cell where the tabs 111 are disposed.

The busbars 13 may form an electrical connection between the battery cells 11, and each of the busbars 13 may be connected to the tabs 111 of at least two battery cells 11 to form an electrical connection between the battery cells 11 connected to each other. For example, the busbar 13 may be implemented with a plate made of conductive metal such as copper (Cu), aluminum (Al), etc., and may be welded to the tabs 111 of the battery cells 11 by welding, etc, the tabs being made of a similar material as the busbar 13.

The coolant channel 15 is a type of pipe through which coolant may flow and the coolant channel 15 may be connected to the busbars 13 directly or indirectly. In consideration of the fact that the coolant channel 15 is directly or indirectly connected to the busbars 13 having conductivity, the coolant channel 15 may be made of a plastic material having no conductivity. A structure in which the busbars 13 are directly connected to the coolant channel 15 may be realized by adopting a process of joining the metal material and the plastic material to each other, for example, a joining process such as seam welding or brazing.

In FIG. 1, the coolant channel 15 has a circular shape in cross section, but various modifications may be made as required. The coolant cooling type battery according to the exemplary embodiment of the present invention may further include a planar-shaped busbar housing 17 to which the busbars 13 are attached to thus align the busbars 13 to desired positions.

The busbar housing 17 may have the busbars 13 attached to a lower surface thereof at positions that correspond to the tabs 111 that are to be electrically connected to each other according to an arrangement structure of the battery cells 11. The busbar housing 17 may include an opening 171 passing through an upper surface and the lower surface of the busbar housing 17 at a position where each of the busbars 13 is attached such that the busbar 13 attached to the lower surface of the busbar housing 17 is exposed upward outside the top of the busbar housing 17. The opening 171 may allow welding energy such as a laser to be emitted to the busbar 13 exposed through the opening 171 in a process of welding the busbar 13 to the tabs 111.

In the example where the busbar housing 17 is provided, the coolant channel 15 may be attached to the upper surface of the busbar housing 17. In consideration of the fact that the busbar housing 17 may be directly or indirectly connected to the busbars 13 having conductivity, the busbar housing 17 may also be made of a plastic material having no conductivity. In one exemplary embodiment, the busbar housing 17 may made of the same material as the coolant channel 15. The busbar housing 17 may be integrally manufactured with the coolant channel 15. The busbars 13 may be attached to the busbar housing 17 by a joining process such as seam welding or brazing which is a process of joining the metal material and the plastic material to each other. Meanwhile, in one exemplary embodiment of the present invention, the busbars 13, the coolant channel 15, and the busbar housing 17 may be realized as an assembly having a module structure.

FIG. 4 is a detailed view showing a coolant cooling type battery according to an exemplary embodiment of the present invention. As shown in FIG. 4, multiple busbars 13, a coolant channel 15, and a busbar housing 17 may form a busbar assembly A, such that the busbar assembly is applied to a part of multiple battery cells 11, the part of the battery cells being arranged adjacent to each other in a successive manner. A required number of busbar assemblies A may be determined and the busbar assemblies A may be arranged on the top of the battery cells 11, and then welding energy may be provided to the top of each of the busbars 13 exposed through an opening 171 of the busbar housing 17 to weld the busbar 13 and tabs 111 of the battery cells 11 together. Thereafter, the coolant channel 15 of each of the busbar assemblies A and the coolant channel 15 of an adjacent busbar assembly A may be joined to be watertight to each other, thereby completing a battery. The coolant channel 15 of each of the busbar assemblies A may be positioned to allow coolant to flow in a direction in which the battery cells 11 are stacked and aligned.

The above-described structural characteristics allow heat generated in the battery cell 11 to be transferred to the busbars 13 through the tabs 111 of the battery cell 11 and the heat previously transferred to the busbars 13 may then be transferred to the coolant channel 15, whereby the heat may be discharged to the outside of the battery cell 11 by coolant flowing through the coolant channel 15. In particular, in the exemplary embodiment of the present invention, heat may be discharged through the busbars 13 directly attached to the tabs 111 of the battery cells 11 and through a heat transfer path of the coolant channel 15 connected with the busbars 13, thus decreasing the heat transfer path and improving the cooling efficiency. Furthermore, in the exemplary embodiment of the present invention, heat may be discharged to the outside of the battery cell 11 directly from the tabs 111 where a greatest amount of heat is generated in the battery cell 11, and thus, the cooling efficiency may be significantly improved. Accordingly, in the exemplary embodiment of the present invention, it may be possible to omit provision of an air gap or a cooling plate between multiple battery cells of a battery in the related art, to reduce the volume of the battery itself, leading to a remarkable increase in the volume-energy density.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A coolant cooling type battery, comprising:
a plurality of battery cells each having tabs to electrically connect the battery cells to each other by respective tabs, wherein the respective tabs of the plurality of battery cells are arranged in a unidirectional alignment;
a plurality of busbars each interconnecting the tabs of adjacent battery cells of the plurality of battery cells with each other to form an electrical connection between the battery cells;
a coolant channel connected to the multiple busbars and having coolant flowing therein; and
a planar-shaped busbar housing having the plurality of busbars attached to a lower surface thereof,
wherein the coolant channel is attached to an upper surface of the busbar housing,
wherein the busbar housing includes an opening through which the busbar is exposed upward outside a top of the busbar housing, and
wherein the opening is opening is provided at positions that correspond to the tabs.

2. The battery of claim 1, wherein the busbar housing is made of a plastic material.

3. The battery of claim 1, wherein the coolant channel is made of a same material as the busbar housing.

4. The battery of claim 1, wherein welding energy is emitted to a top of the busbar exposed through the opening to weld the busbar and the tabs positioned under the busbar together.

5. A coolant cooling type battery, comprising:
a plurality of battery cells each having tabs to electrically connect the battery cells to each other by respective tabs, wherein the respective tabs of the plurality of battery cells are arranged in a unidirectional alignment; and
a plurality of busbar assemblies each having a plurality of busbars each interconnecting the tabs of a part of the plurality of battery cells with each other, the part of the battery cells being arranged adjacent to each other, to form an electrical connection between the part of the battery cells, and having a planar-shaped busbar housing having the plurality of busbars attached to a lower surface thereof, each busbar assembly having a coolant channel attached to an upper surface of the busbar housing,
wherein respective coolant channels of the plurality of busbar assemblies are arranged in a direction in which the battery cells are aligned and the coolant channels of each busbar assembly are joined together,
wherein welding energy is emitted to a top of the busbar exposed through the opening to weld the busbar and the tabs positioned under the busbar together, and
wherein the opening is provided at positions that correspond to the tabs.

6. The battery of claim 5, wherein the busbar housing is made of a plastic material.

7. The battery of claim 6, wherein the coolant channel is made of a same material as the busbar housing.

8. The battery of claim 5, wherein welding energy is emitted to a top of the busbar exposed through the opening to weld the busbar and the tabs positioned under the busbar together.

\* \* \* \* \*